United States Patent
Yen et al.

(10) Patent No.: US 11,705,812 B2
(45) Date of Patent: Jul. 18, 2023

(54) CURRENT-BASED TRANSITIONS BETWEEN BUCK CONVERTER AND CHARGE PUMP MODES IN AN ADAPTIVE COMBINATION POWER SUPPLY CIRCUIT

(71) Applicant: QUALCOMM Incorporated, San Diego, CA (US)

(72) Inventors: Ta-Tung Yen, San Jose, CA (US); Sanghwa Jung, Los Gatos, CA (US); Xiaolin Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/216,171

(22) Filed: Mar. 29, 2021

(65) Prior Publication Data
US 2022/0311339 A1    Sep. 29, 2022

(51) Int. Cl.
*H02M 3/158*    (2006.01)
*H02M 3/07*    (2006.01)

(52) U.S. Cl.
CPC ........... *H02M 3/1582* (2013.01); *H02M 3/07* (2013.01)

(58) Field of Classification Search
CPC .............................. H02M 3/1582; H02M 3/07
See application file for complete search history.

(56) References Cited

U.S. PATENT DOCUMENTS

| | | | | |
|---|---|---|---|---|
| 10,389,237 B1 * | 8/2019 | Chee | ..................... | H02M 3/158 |
| 10,483,846 B1 * | 11/2019 | Allegrini | ............... | H02M 3/073 |
| 10,931,147 B2 | 2/2021 | Chen et al. | | |
| 11,251,657 B2 * | 2/2022 | Chen | .................... | H04B 5/0093 |
| 2015/0145497 A1 * | 5/2015 | Torres | ..................... | H02M 3/07 323/283 |
| 2016/0190921 A1 | 6/2016 | Kumar et al. | | |
| 2020/0161976 A1 * | 5/2020 | Song | ..................... | H02M 3/158 |
| 2020/0366120 A1 * | 11/2020 | Yuan | ........................ | H02J 7/02 |
| 2021/0083573 A1 | 3/2021 | Yen et al. | | |
| 2021/0265856 A1 * | 8/2021 | Nishikawa | ............ | H02J 7/0048 |
| 2021/0265913 A1 * | 8/2021 | Cannillo | ............. | H02M 3/1584 |

OTHER PUBLICATIONS

International Search Report and Written Opinion—PCT/US2022/071071—ISA/EPO—dated Jun. 15, 2022.

* cited by examiner

*Primary Examiner* — Sibin Chen
(74) *Attorney, Agent, or Firm* — Patterson + Sheridan, L.L.P.

(57) ABSTRACT

Techniques and apparatus for current-based transitioning between a buck converter mode and a charge pump mode in an adaptive combination power supply circuit. One example power supply circuit generally includes a switching regulator and control logic coupled to the switching regulator. The control logic is generally configured to compare an indication of a current associated with the switching regulator to a threshold and to control a transition of the switching regulator between a buck converter mode and a charge pump mode based on the comparison.

25 Claims, 7 Drawing Sheets

CURRENT-BASED TRANSITIONS BETWEEN BUCK CONVERTER AND CHARGE PUMP MODES IN AN ADAPTIVE COMBINATION POWER SUPPLY CIRCUIT

TECHNICAL FIELD

Certain aspects of the present disclosure generally relate to electronic circuits and, more particularly, to an adaptive combination power supply circuit capable of transitioning between a buck converter mode and a charge pump mode based on a current associated with the power supply circuit.

BACKGROUND

A voltage regulator provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches may be implemented with transistors, although the low-side switch may alternatively be implemented with a diode.

A charge pump is a type of SMPS typically comprising at least one switching device to control the connection of a supply voltage across a load through a capacitor. In a voltage doubler, for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power requirement of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure provide a power supply circuit. The power supply circuit generally includes a switching regulator and control logic coupled to the switching regulator. The control logic is generally configured to compare a first indication of a current associated with the switching regulator to a first threshold and to control a transition of the switching regulator between a buck converter mode and a charge pump mode based on the comparison.

Certain aspects of the present disclosure are directed to a method of supplying power. The method generally includes comparing a first indication of a current associated with a switching regulator to a first threshold and transitioning the switching regulator between a buck converter mode and a charge pump mode based on the comparison.

Certain aspects of the present disclosure provide a power management integrated circuit (PMIC) comprising at least a portion of the power supply circuit described herein.

Certain aspects of the present disclosure are directed to an apparatus. The apparatus generally includes a battery; a battery charging circuit having an output coupled to the battery; a switching regulator having an input coupled to the battery; and control logic coupled to the switching regulator. The control logic is configured to compare an indication of a current associated with the switching regulator to a threshold and to control a transition of the switching regulator between a buck converter mode and a charge pump mode based on the comparison.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
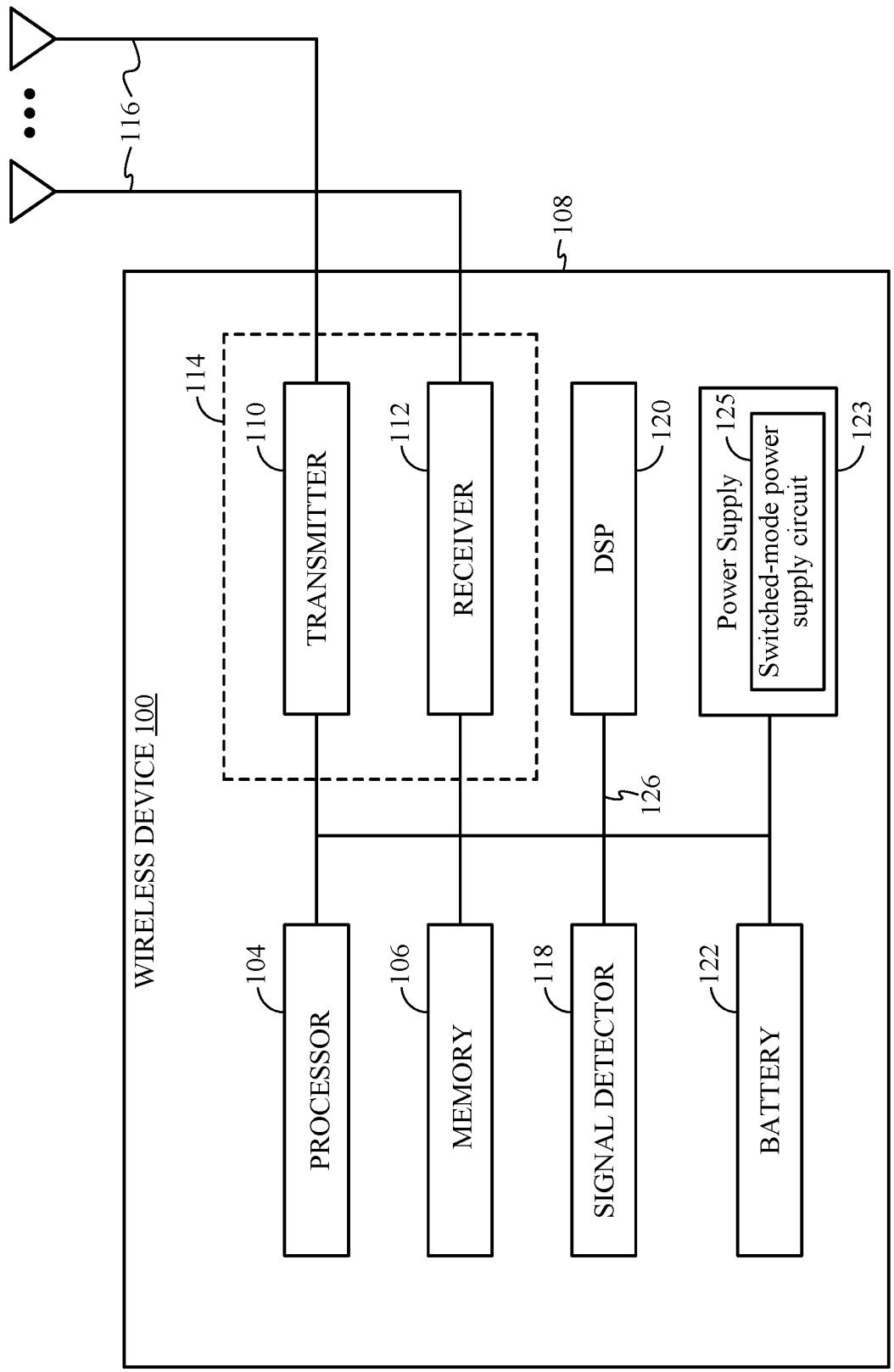
FIG. 1 illustrates a block diagram of an example device that includes a power supply system with at least one switched-mode power supply (SMPS) circuit, in accordance with certain aspects of the present disclosure.

Certain aspects of the present disclosure provide techniques and apparatus for transitioning between a buck converter mode and a charge pump mode in an adaptive combination power supply circuit based on at least one of an input current or an output current of the circuit. As used herein, an adaptive combination power supply circuit generally relates to a switched-mode power supply (SMPS) circuit capable of switching between two different operational modes, such as between a three-level buck converter mode and a divide-by-two (Div2) charge pump mode.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCSs), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power supply system 123 for managing the power from the battery to the various components of the device 100. At least a portion of the power supply system 123 may be implemented in one or more power management integrated circuits (power management ICs or PMICs) The power supply system 123 may perform a variety of functions for the device 100 such as DC-to-DC conversion, battery charging, power-source selection, voltage scaling, power sequencing, etc. For example, the power supply system 123 may include a battery charging circuit (e.g., a master-slave battery charging circuit) for charging the battery 122. The power supply system 123 includes one or more power supply circuits, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit (e.g., the power supply circuit 300 of FIG. 3A), which can switch between operating in a buck converter mode and a charge pump mode, as described below.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Scheme

Figure 2:
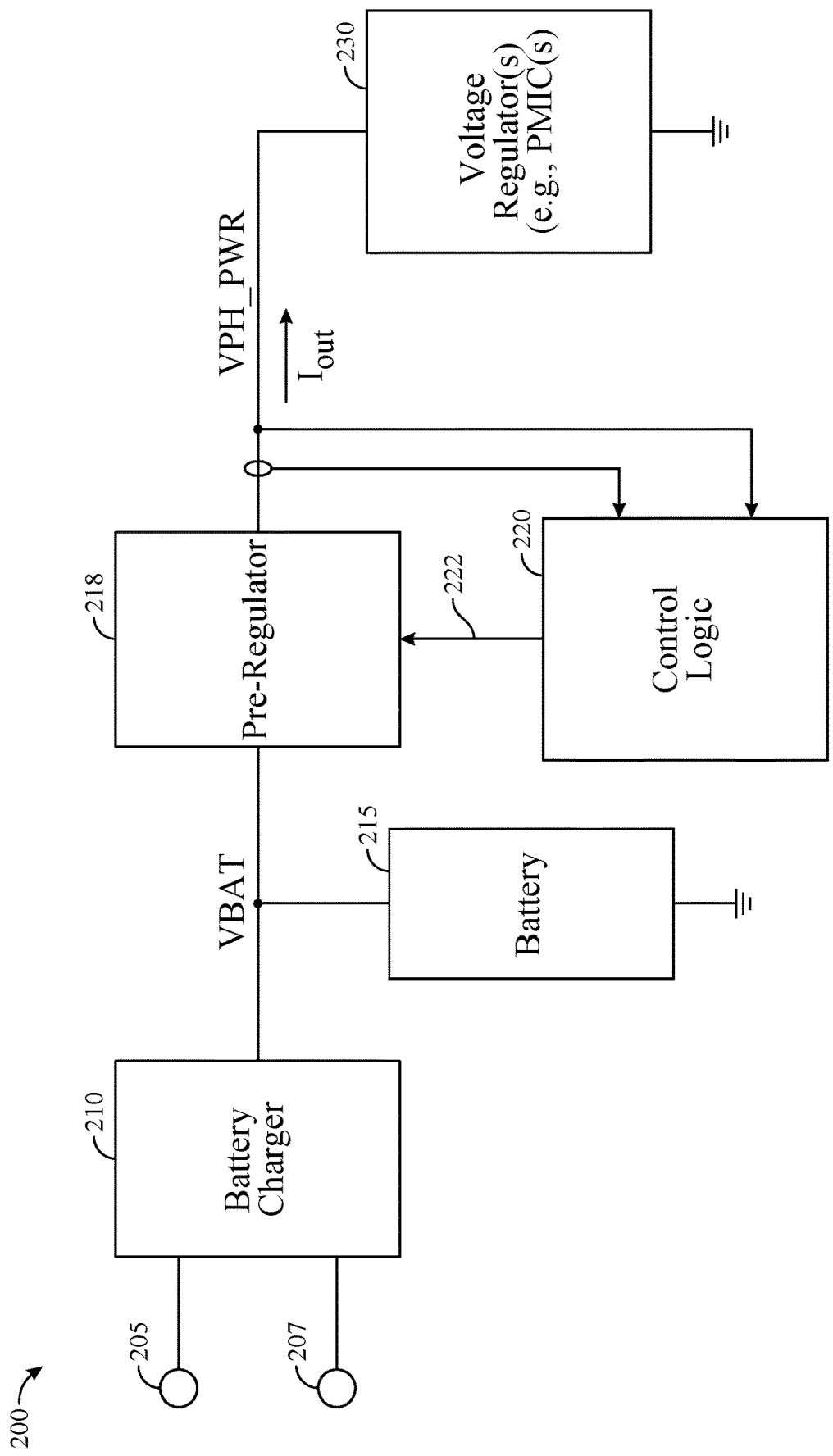
FIG. 2 is a block diagram of an example power supply scheme comprising a battery charging circuit, a battery circuit, and a pre-regulator for regulating power to one or more voltage regulators, in accordance with certain aspects of the present disclosure.

FIG. 2 is a block diagram of an example power supply scheme 200, in accordance with certain aspects of the present disclosure. The power supply scheme 200 includes a battery charging circuit 210, a battery circuit 215, a pre-regulator 218, and one or more voltage regulators 230. Control logic 220 may receive various inputs (e.g., voltage and/or current feedback signals) and may control the pre-regulator 218, the battery charging circuit 210, and/or the voltage regulators 230.

The battery charging circuit 210 may receive power from one or more ports (e.g., ports 205 and 207), and this received power may be converted and used to charge a battery or a battery pack in a battery circuit 215 of a portable device (e.g., a smartphone, tablet, and the like). For example, port 205 may be a Universal Serial Bus (USB) port for connecting to a wall adapter, whereas port 207 may be a wireless power port. The battery circuit 215 may include a single-cell or multi-cell-in-series battery (e.g., a two-cell-in-series, or 2S, battery). The battery circuit 215 may also include any protection circuitry, which may include switches implemented by transistors, for example. For certain aspects, the battery charging circuit 210, or at least a portion thereof, may reside in a PMIC in the device. The battery charging circuit 210 may comprise, for example, one or more switched-mode power supplies (e.g., a buck converter and/or a charge pump converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies, such as a three-level buck converter topology. However, one or more of the buck converters may be replaced with a charge pump converter in some parallel charging circuits.

The pre-regulator 218 may receive power from the battery with a voltage VBAT (e.g., 7 to 9 V). Used to regulate power for the voltage regulators 230, the pre-regulator 218 may comprise, for example, one or more switched-mode power supplies (e.g., a buck converter, a charge pump converter, or an adaptive combination power supply circuit capable of switching therebetween). As described below, the control logic 220 may receive an indication of a current associated with the pre-regulator 218 (e.g., output current Iout) and an indication of the output voltage VPH_PWR (e.g., 3.3 to 4 V) from the pre-regulator. Based, at least in part, on these indications, the control logic 220 may output one or more control signals 222 to control the pre-regulator 218. For example, in the case of a three-level buck converter topology, the control logic 220 may output signals as inputs to the gate drivers for driving the power transistors to regulate the output voltage VPH_PWR. The one or more voltage regulators 230 may include one or more linear regulators and/or one or more switching regulators for generating smaller voltages (e.g., 1.2 to 3.3 V) from VPH_PWR. For certain aspects, the voltage regulators 230 may include core PMICs for the device.

Example Adaptive Combination Power Supply Circuits and Operation

As described above, a pre-regulator (e.g., the pre-regulator 218) may be implemented by a switched-mode power supply (e.g., a buck converter, a charge pump converter, or an adaptive combination power supply circuit capable of switching therebetween), which may be a single-phase or multi-phase converter. In the case of an adaptive combination power supply circuit, both converter modes may be single-phase, both converter modes may be multi-phase, one converter mode may be single-phase while the other converter mode is multi-phase or capable of changing between single-phase and multi-phase, or one converter mode may be multi-phase while the other converter mode is capable of changing between single-phase and multi-phase.

A single-phase three-level buck converter topology (as illustrated in the power supply circuit 300 of FIG. 3A) may include a first transistor Q1, a second transistor Q2, a third transistor Q3, a fourth transistor Q4, a flying capacitive element Cfly, an inductive element L1, and a load 310, which is represented here by a capacitor. An adaptive combination power supply circuit may be realized by adding a switch S1 across the inductive element L1 of the three-level buck converter topology. With the switch S1 closed, the adaptive combination power supply circuit may function as a single-phase divide-by-two (Div2) charge pump converter, as further described below.

Figure 3A:
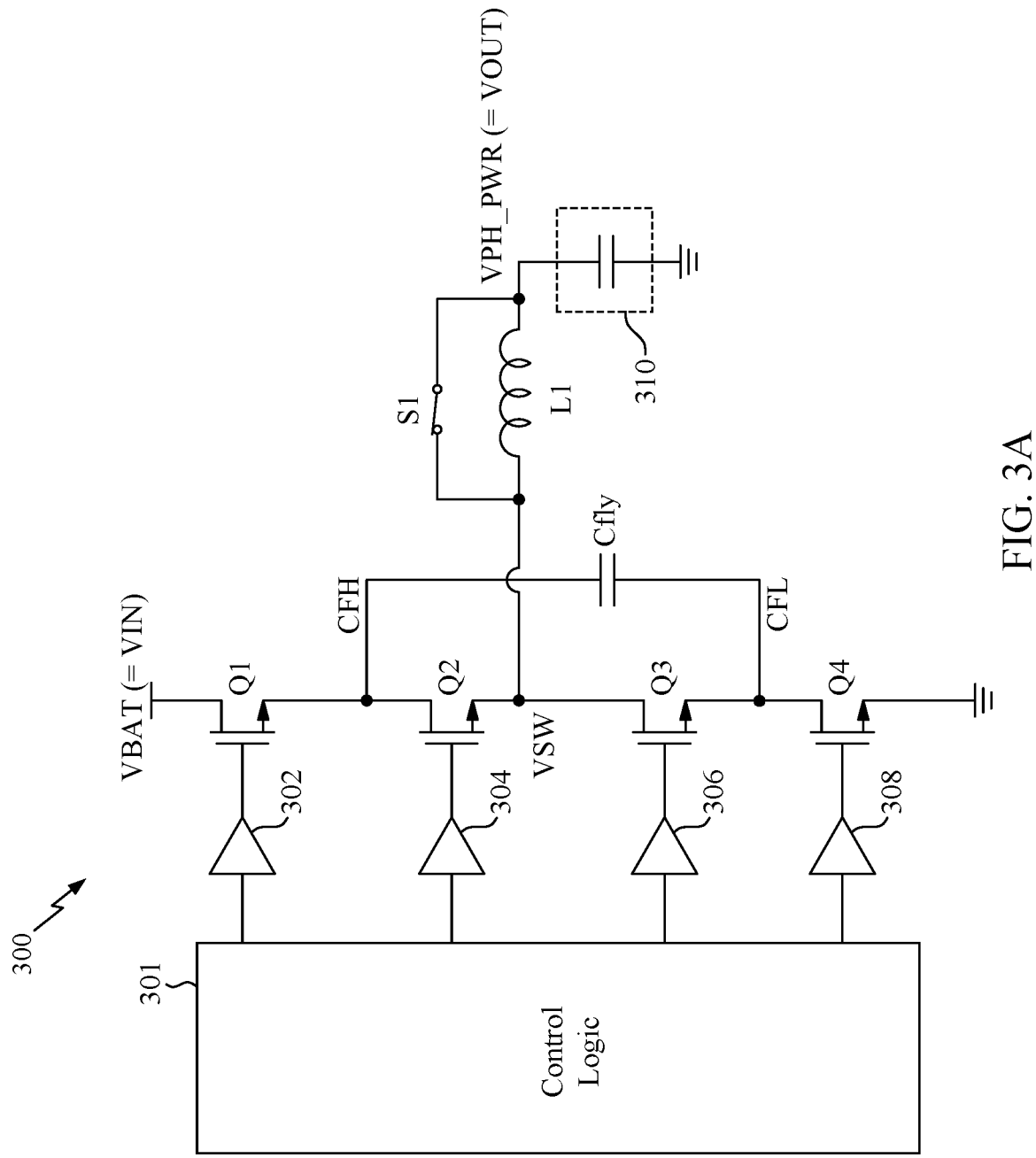
FIG. 3A is a circuit diagram of an example adaptive SMPS circuit, in accordance with certain aspects of the present disclosure.

Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 3A. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electric ground) for the power supply circuit 300. The flying capacitive element Cfly may have a first terminal coupled to the first node and a second terminal coupled to the third node. The inductive element L1 may have a first terminal coupled to the second node and a second terminal coupled to an output voltage node (labeled "VPH_PWR," but also referred to as "VOUT") and the load 310.

Control logic 301 may control operation of the power supply circuit 300 and may be the same or different from control logic 220 in FIG. 2. For example, control logic 301 may control operation of the transistors Q1-Q4 via output signals to the inputs of respective gate drivers 302, 304, 306, and 308. The outputs of the gate drivers 302, 304, 306, and 308 are coupled to respective gates of transistors Q1-Q4. During operation of the power supply circuit 300, the control logic 301 may cycle through four different phases, which may differ depending on whether the duty cycle is less than 50% or greater than 50%.

Operation of the power supply circuit 300 with a duty cycle of less than 50% is described first. In a first phase (referred to as a "charging phase"), transistors Q1 and Q3 are activated, and transistors Q2 and Q4 are deactivated, to charge the flying capacitive element Cfly and to energize the inductive element L1. In a second phase (called a "holding phase"), transistor Q1 is deactivated, and transistor Q4 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q2 and Q4 are activated, and transistor Q3 is deactivated, to discharge the flying capacitive element Cfly and to energize the inductive element L1. In a fourth phase (also referred to as a "holding phase"), transistor Q3 is activated, and transistor Q2 is deactivated, such that the flying capacitive element Cfly is disconnected and the inductive element L1 is deenergized.

Operation of the power supply circuit 300 with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "VBAT," but also referred to as "VIN"), the flying capacitive element Cfly is disconnected, and the inductive element L1 is energized. Similarly in the fourth phase (also referred to as a "holding phase") with a duty cycle greater than 50%, transistor Q1 is activated, and transistor Q4 is deactivated, such that the flying capacitive element Cfly is disconnected and the inductive element L1 is energized.

Furthermore, the control logic 301 has a control signal (not shown in FIG. 3A) configured to control operation of switch S1 and selectively enable divide-by-two (Div2) charge pump operation. For certain aspects, when this control signal is logic low, switch S1 is open, and the power supply circuit 300 operates as a three-level buck converter using the inductive element L1. When this control signal is logic high for certain aspects, switch S1 is closed, thereby shorting across the inductive element L1 and effectively removing the inductive element L1 from the circuit, such that the power supply circuit 300 operates as a Div2 charge pump. The control logic 301 may be configured to automatically control operation of switch S1 (e.g., through the logic level of the control signal) based on at least one of an output current (also referred to as a "load current") or an input current for the power supply circuit 300.

For certain aspects, the power supply circuit may be implemented as a multi-phase SMPS circuit as an alternative to a single-phase SMPS circuit (e.g., power supply circuit 300). For example, FIG. 3B is a circuit diagram of an example power supply circuit 350 capable of operating as a single-phase three-level buck converter or as a single-phase or dual-phase Div2 charge pump, in accordance with certain aspects of the present disclosure.

Figure 3B:
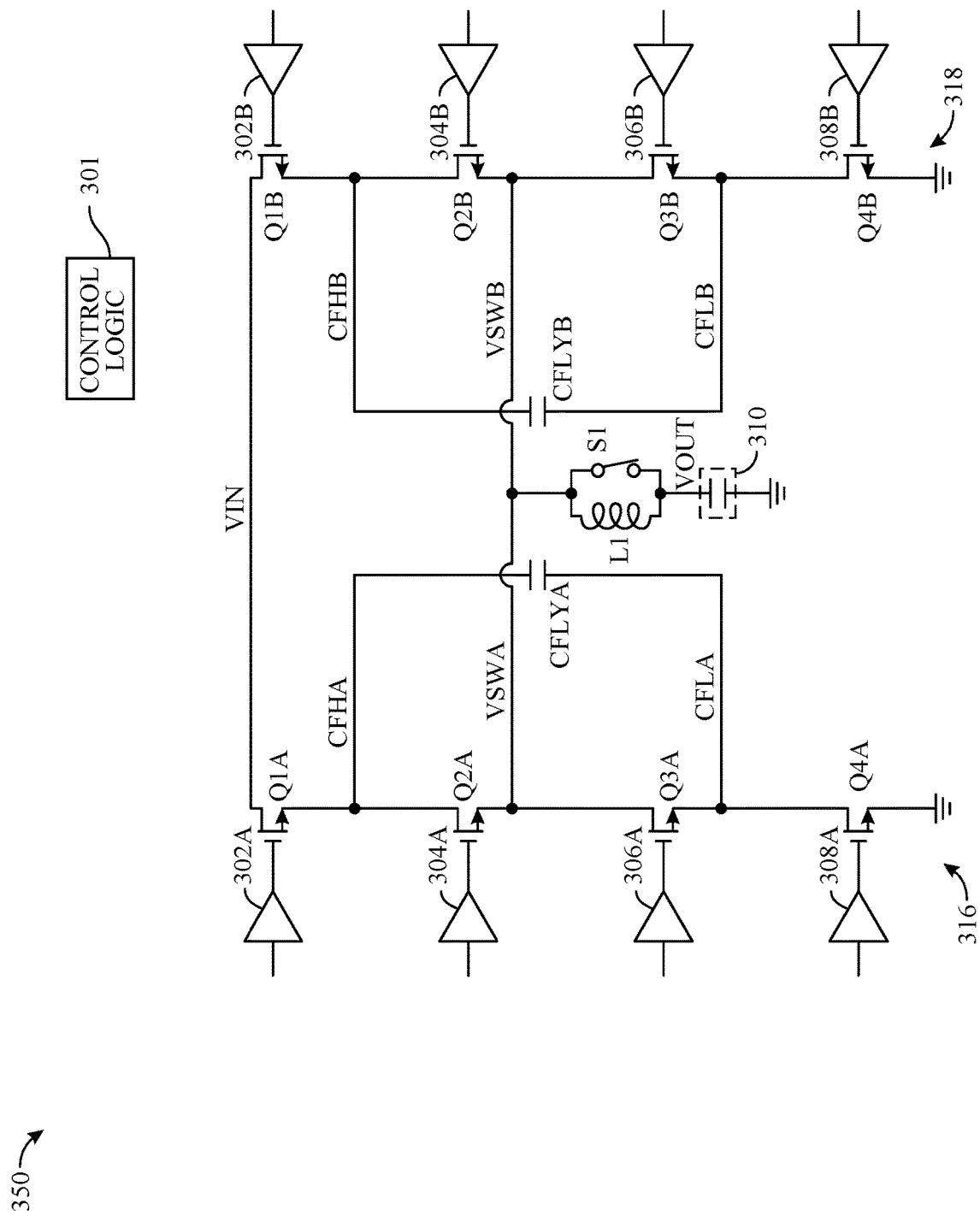
FIG. 3B is a circuit diagram of another example adaptive SMPS circuit, in accordance with certain aspects of the present disclosure.

As illustrated in FIG. 3B, the power supply circuit 350 may include (e.g., similar to the power supply circuit 300 of FIG. 3A) first transistors Q1A and Q1B, second transistors Q2A and Q2B, third transistors Q3A and Q3B, fourth transistors Q4A and Q4B, flying capacitive elements CflyA and CflyB, an inductive element L1, and a load 310, which is represented here by a capacitor. A multi-phase adaptive combination power supply circuit may be realized by adding a switch S1 across the inductive element L1 of the power supply circuit 350. As shown, the components corresponding to one another (e.g., the transistors Q1A and Q1B) in each branch (or phase) of the power supply circuit 350 may be coupled in similar fashions. That is, components in the "A" branch 316 may be coupled to similar corresponding components as the components in the "B" branch 318 of the power supply circuit 350.

For example, transistor Q2A may be coupled to transistor Q1A via a first node (labeled "CFHA" for flying capacitor high node of branch A), transistor Q3A may be coupled to transistor Q2A via a second node (labeled "VSWA" for voltage switching node of branch A), and transistor Q4A may be coupled to transistor Q3A via a third node (labeled "CFLA" for flying capacitor low node of branch A). For certain aspects, the transistors Q1A-Q4A may be implemented as NMOS transistors, as illustrated. In this case, the drain of transistor Q2A may be coupled to the source of transistor Q1A, the drain of transistor Q3A may be coupled to the source of transistor Q2A, and the drain of transistor Q4A may be coupled to the source of transistor Q3A. The source of transistor Q4A may be coupled to a reference potential node (e.g., electric ground) for the power supply circuit 350. The flying capacitive element CflyA may have a first terminal coupled to the first node (CFHA) and a second terminal coupled to the third node (CFLA). The inductive element L1 may have a first terminal coupled to the second node (VSWA) and a second terminal coupled to an output voltage node (labeled "VOUT") and the load 310.

In a similar fashion, transistor Q2B may be coupled to transistor Q1B via a fourth node (labeled "CFHB" for flying capacitor high node of branch B), transistor Q3B may be coupled to transistor Q2B via a fifth node (labeled "VSWB" for voltage switching node of branch B), and transistor Q4B may be coupled to transistor Q3B via a sixth node (labeled "CFLB" for flying capacitor low node of branch B). For certain aspects, the transistors Q1B-Q4B may be implemented as NMOS transistors, as illustrated. In this case, the drain of transistor Q2B may be coupled to the source of transistor Q1B, the drain of transistor Q3B may be coupled to the source of transistor Q2B, and the drain of transistor Q4B may be coupled to the source of transistor Q3B. The source of transistor Q4B may be coupled to a reference potential node (e.g., electric ground) for the power supply circuit 350. The flying capacitive element CflyB may have a first terminal coupled to the fourth node (CFHB) and a second terminal coupled to the sixth node (CFLB). The first terminal of the inductive element L1 may also be coupled to the fifth node (VSWB).

Control logic 301 may control operation of the power supply circuit 350. For example, control logic 301 may control operation of the transistors Q1A, Q1B, Q2A, Q2B, Q3A, Q3B, Q4A, and Q4B via output signals to the inputs of respective gate drivers 302A, 302B, 304A, 304B, 306A, 306B, 308A, and 308B. In other words, the outputs of the gate drivers 302A, 304A, 306A, and 308A are coupled to respective gates of transistors Q1A-Q4A, while the outputs of the gate drivers 302B, 304B, 306B, and 308B are coupled to respective gates of transistors Q1B-Q4B. Similar to the power supply circuit 300 of FIG. 3A, and as described above, during operation of the power supply circuit 350, the control logic 301 may cycle through four different phases, which may differ depending on whether the duty cycle is less than 50% or greater than 50%.

As explained above, the power supply circuit 350 is an adaptive combination power supply circuit capable of operating as a single-phase three-level buck converter or as a single-phase or dual-phase Div2 charge pump. To implement an adaptive combination power supply circuit capable of operating as a dual-phase three-level buck converter (or as a single-phase or dual-phase Div2 charge pump), two inductive elements may be coupled in series between the second node (VSWA) and the fifth node (VSWB) of the power supply circuit 350, each inductive element having a separate switch coupled in parallel therewith, and the load (e.g., load 310) may be coupled in shunt to an output voltage node between the two inductive elements (e.g., making a T-shaped circuit between the switching nodes).

Example Current-Based Transitioning

The design choice for realizing a pre-regulator (e.g., the pre-regulator 218) may be based on a number of different factors. For example, a charge pump (e.g., a Div2 charge pump) may offer better efficiency under light load conditions (e.g., <100 mA), whereas a buck converter (e.g., a three-level buck converter) may be used to meet higher current demands under heavy load conditions. A configurable architecture (e.g., an adaptive combination power supply circuit) may enable operating as a charge pump in light load conditions and operating as a buck converter in heavy load conditions. Furthermore, compared to a two-level buck converter, a three-level buck converter may offer a significant output ripple reduction, thereby enabling a smaller inductance with a smaller profile. Unlike a battery charger (e.g., the battery charging circuit 210), the pre-regulator 218 has a battery as an input power source, which may mean the input voltage (e.g., VBAT) is fixed and cannot be adjusted.

Certain aspects of the present disclosure provide techniques and apparatus for transitioning between a buck converter mode and a charge pump mode in an adaptive combination power supply circuit based on at least one of an input current or an output current of the circuit. This current-based transition method may offer higher accuracy than similar voltage-based transition methods. Furthermore, such a current-based transition techniques may provide better load transient behavior due to early current detection.

Figure 4:
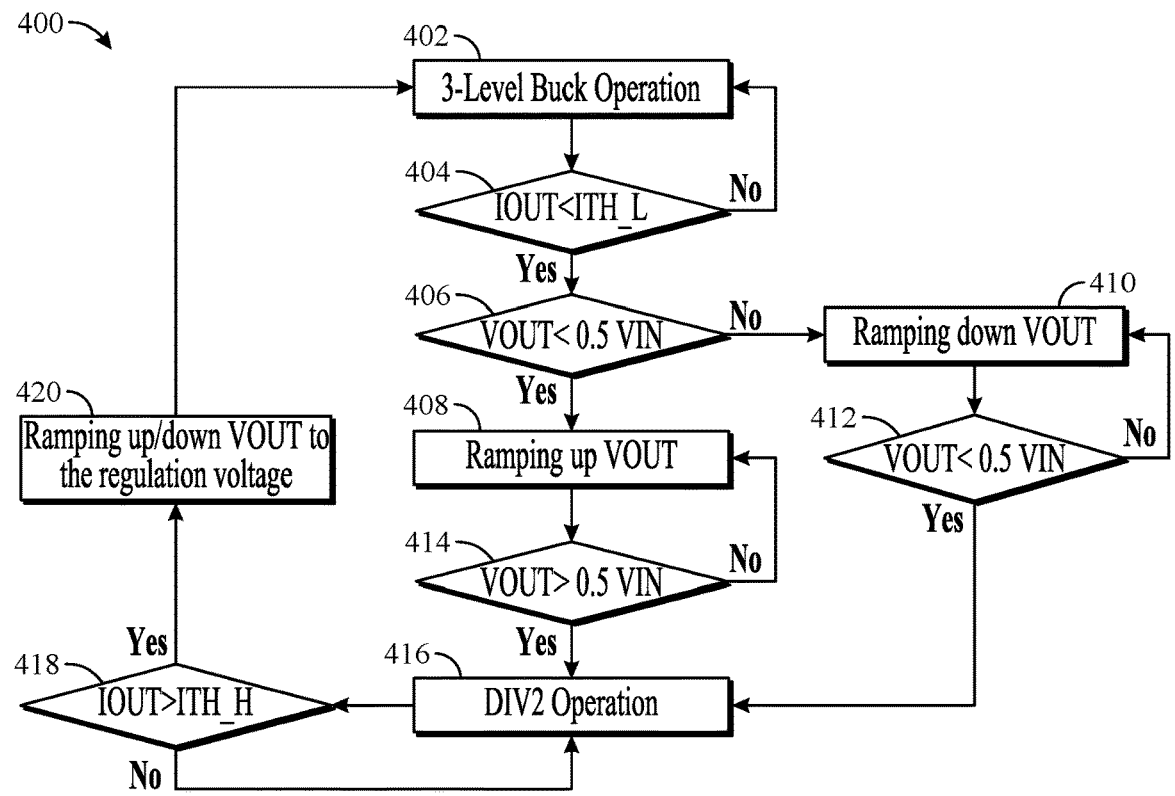
FIG. 4 is a flow chart of example operations for transitioning between a buck converter mode and a charge pump mode in an adaptive combination power supply circuit, in accordance with certain aspects of the present disclosure.
Figure 5:
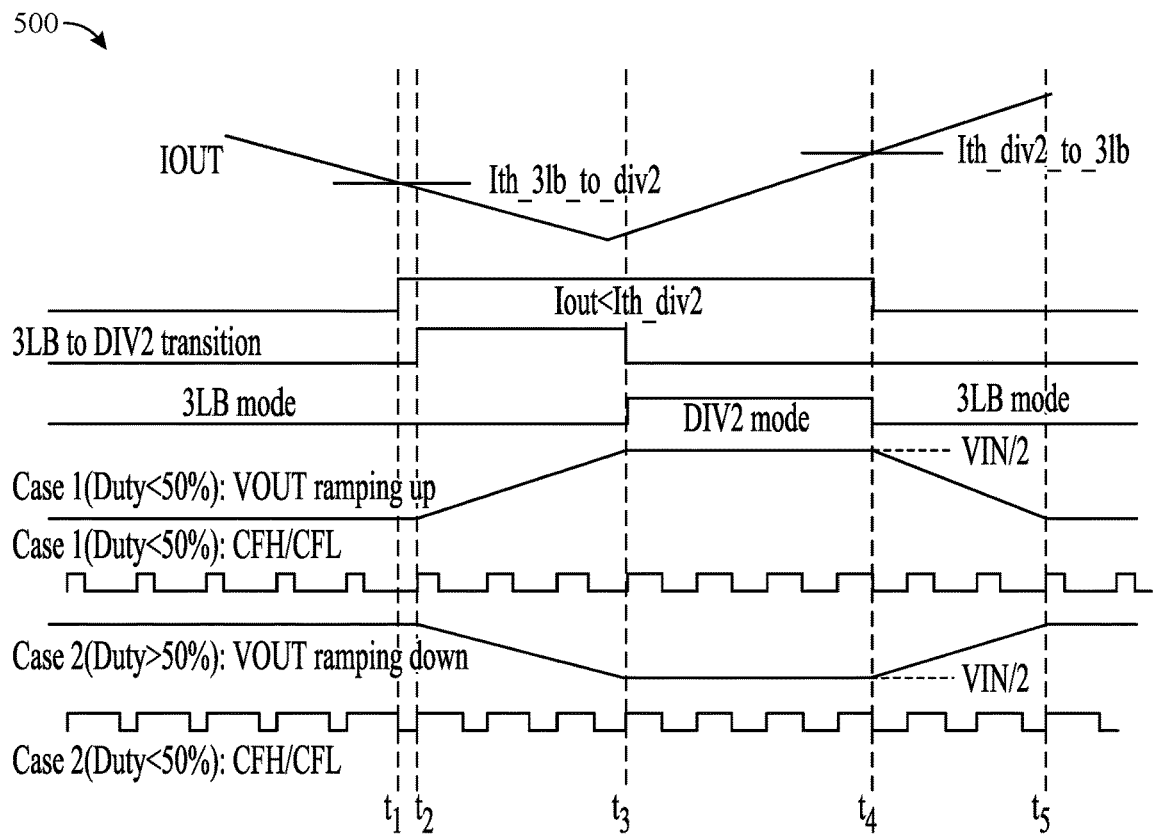
FIG. 5 is an example timing diagram for an adaptive combination power supply circuit transitioning from a buck converter mode to a charge pump mode and then from the charge pump mode to the buck converter mode, in accordance with certain aspects of the present disclosure.

FIG. 4 is a flow chart 400 of example operations for transitioning between a buck converter mode and a charge pump mode in an adaptive combination power supply circuit, in accordance with certain aspects of the present disclosure. The operations may be performed by control logic in or associated with the power supply circuit. FIG. 5 is an example timing diagram 500 illustrating the associated operations in the flow chart 400 of FIG. 4, in accordance with certain aspects of the present disclosure. Although the flow chart 400, the timing diagram 500, and the associated description herein provide the example of transitioning between a three-level buck converter mode and a Div2 charge pump mode, it is to be understood that elements of the flow chart 400 and the timing diagram 500 may also apply to other buck converter modes and/or other charge pump modes.

Starting from state 402 in which the power supply circuit operates in a three-level buck converter mode, the circuit may determine at decision block 404 whether the output current Iout is less than a lower threshold current Ith_1 (e.g., Ith_31b_to_div2 in FIG. 5). If the output current Iout is not less than the lower threshold current, then the power supply circuit may continue operating in three-level buck converter mode at state 402. If the output current Iout is determined to be less than the lower threshold current at decision block 404, then the power supply circuit enters a new state at $t_1$ where the output current Iout is less than the lower threshold current until the output current rises above a higher threshold current Ith_h (e.g., Ith_div2_to_31b in FIG. 5). Stated another way, this new state may be expressed as Iout<Ith_div2 as illustrated in FIG. 5, where the power supply circuit is not operating in the three-level buck converter mode (e.g., between times $t_1$ and $t_4$).

In this new state, the power supply circuit determines at decision block 406 whether the output voltage Vout is less than half the input voltage Vin (i.e., the duty cycle is less than 50%). If Vout<Vin/2 at decision block 406, then the power supply circuit begins ramping up the output voltage Vout at block 408 (and at time $t_2$ in FIG. 5, illustrated by Case 1). The waveform for CFH (or CFL) in Case 1 with a duty cycle of less than 50% before $t_2$ is also shown in FIG. 5. From block 408 in FIG. 4, the power supply circuit checks whether the output voltage Vout is greater than (or in some cases, greater than or equal to) half the input voltage Vin at decision block 414. If not, the power supply circuit continues ramping up the output voltage Vout at block 408. After the power supply circuit determines that Vout>Vin/2 at decision block 414, the power supply circuit enters state 416 in which the circuit operates in a Div2 charge pump mode (and at time $t_3$ in FIG. 5). The waveform for CFH (or CFL) in Case 1 has a duty cycle that increases to 50% between $t_2$ and $t_3$ as shown in FIG. 5. Returning to decision block 406 in FIG. 4, if the output voltage Vout is greater than half the input voltage Vin (i.e., the duty cycle is greater than 50%), then the power supply circuit begins ramping down the output voltage Vout at block 410 (and at time $t_2$ in FIG. 5, illustrated by Case 2). The waveform for CFH (or CFL) in Case 2 with a duty cycle of more than 50% before $t_2$ is also shown in FIG. 5. From block 410 in FIG. 4, the power supply circuit determines whether the output voltage Vout is less than (or in some cases, less than or equal to) half the input voltage Vin at decision block 412. If not, the power supply circuit continues ramping down the output voltage Vout at block 410. After the power supply circuit determines that Vout<Vin/2 at decision block 412, the power supply circuit enters state 416 in which the circuit operates in a Div2 charge pump mode (and at time $t_3$ in FIG. 5). The waveform for CFH (or CFL) in Case 2 has a duty cycle that decreases to 50% between $t_2$ and $t_3$ as shown in FIG. 5.

During the ramp up or ramp down operation, the power supply circuit is transitioning gradually from the buck converter mode to the charge pump mode, as illustrated by the logic high level for the signal labeled "3LB to DIV2 transition" in FIG. 5. This gradual transition may avoid a large inrush current into the load capacitor (e.g., of load 310).

From state 416, the power supply circuit may determine at decision block 418 whether the output current Iout is greater than the higher threshold current Ith_h (e.g., Ith_div2_to_31b in FIG. 5). If the output current Iout is not greater than the higher threshold current, then the power supply circuit may continue operating in the Div2 charge pump mode at state 416. If the output current Iout is determined to be greater than the higher threshold current at decision block 418, then the power supply circuit begins ramping up or down the output voltage Vout as appropriate at block 420 (at time $t_4$ in FIG. 5) under three-level buck converter mode operation until the specified target voltage is achieved (at time is in FIG. 5). While the waveform for CFH (or CFL) in Case 1 and Case 2 remained at a duty cycle of 50% between times $t_3$ and $t_4$, the waveform for CFH (or CFL) in either case has a duty cycle that changes from 50% between $t_4$ and is as shown in FIG. 5. The power supply circuit then enters state 402 in FIG. 4 again.

Although the operations in FIG. 4 perform transitions between buck converter and charge pump modes based on output current, the input current of a voltage regulator (e.g., the pre-regulator) may also be monitored, and transitions between the modes may be controlled based on an indication of the input current. The indication of a current (input or output) may be a representation of a current value or a representation of a voltage value across a current-sensing resistor, for example.

Figure 6:
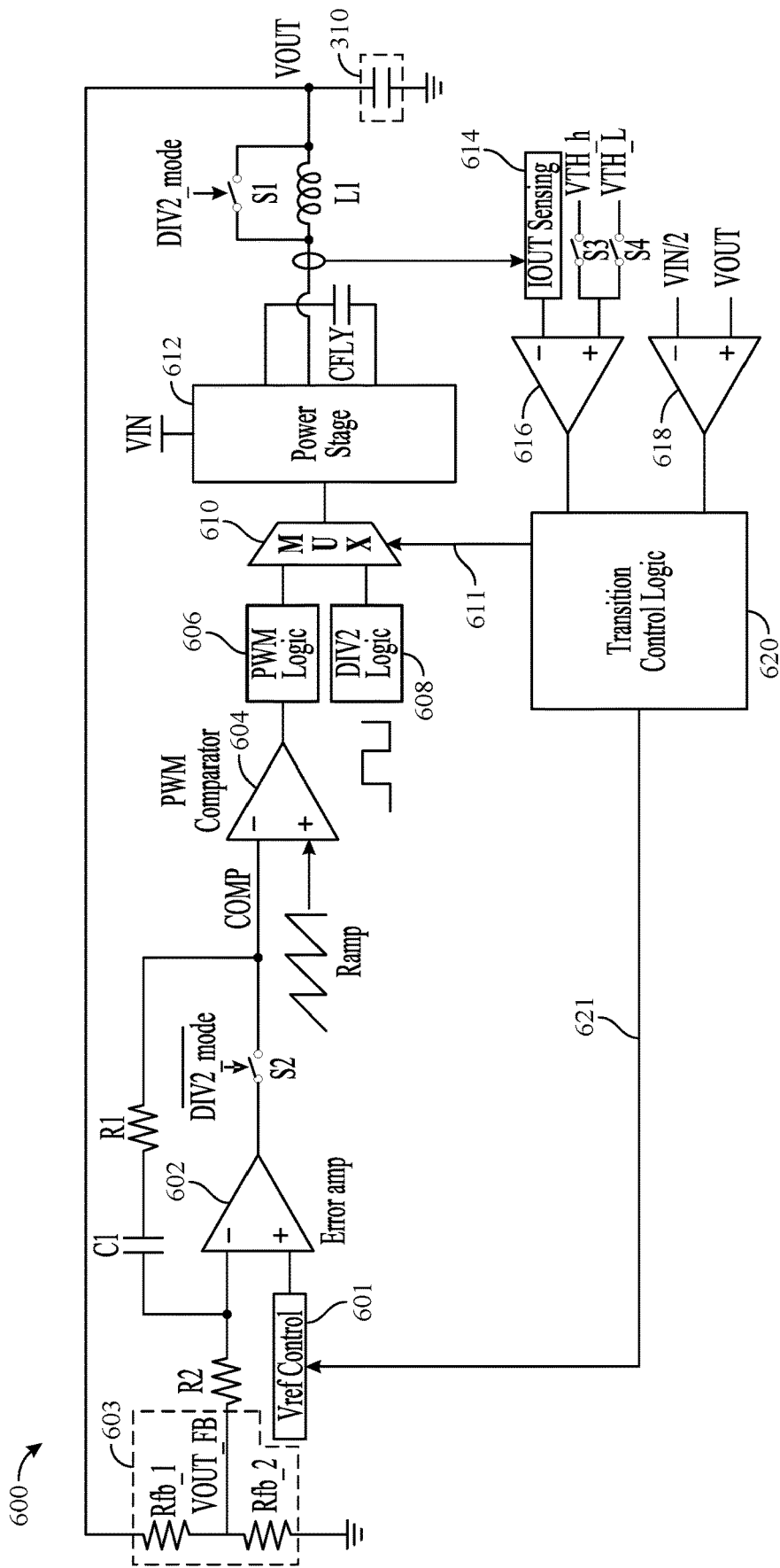
FIG. 6 is a block diagram of an example implementation of a power supply circuit capable of transitioning between a charge pump mode and a buck converter mode based on load current, in accordance with certain aspects of the present disclosure.

FIG. 6 is a block diagram of an example implementation of a power supply circuit 600 capable of transitioning between a charge pump mode and a buck converter mode based on load current, in accordance with certain aspects of the present disclosure. In this example implementation, the power supply circuit 600 may include a voltage divider 603, an error amplifier 602, a reference voltage control circuit 601, switches S2, S3, and S4, a pulse-width-modulation (PWM) comparator 604, PWM logic 606, Div2 logic 608, a multiplexer 610, a power stage 612, a current-sensing circuit 614, comparators 616, 618, and transition control logic 620 (e.g., a portion of control logic 220), among various passive components and other components described above.

The output current Iout of the voltage regulator (e.g., the pre-regulator 218) may be sensed by the current-sensing circuit 614. An indication of the output current Iout (e.g., a representative voltage) may be output by the current-sensing circuit 614 and may be compared with either a higher threshold (e.g., Vth_h) or a lower threshold (Vth_1) by comparator 616, as controlled by switches S3 and S4, respectively. For example, the higher threshold may be a higher threshold voltage corresponding to the higher threshold current Ith_h, and the lower threshold may be a lower threshold voltage corresponding to the lower threshold current Ith_1, as described above for the comparisons in decision blocks 418 and 404, respectively. The switches S3 and S4 may be closed depending on the current state of the power supply circuit (e.g., in a buck converter mode or in a charge pump mode).

The output voltage Vout may be compared to half of the input voltage Vin by the comparator 618, as described above in decision blocks 406, 412, and 414, for example. The outputs of the comparators 616 and 618 are provided to the transition control logic 620. For certain aspects, the transition control logic 620 may operate according to the flow chart 400 of FIG. 4. The transition control logic 620 may output a first control signal 621 for controlling the target reference voltage (Vref) via the reference voltage control circuit 601. The transition control logic 620 may also output a second control signal 611 for controlling the multiplexer 610 to select between the buck converter mode and the charge pump mode for operating the power stage 612 of the power supply circuit. The power stage 612 may have a single-phase or a multi-phase topology and may include gate drivers and power transistors, as described above.

The output voltage Vout may be divided down by the voltage divider 603, and the error amplifier 602 may compare the divided down voltage Vout_fb with the target reference voltage from the reference voltage control circuit 601. Switch S2 may be closed for the buck converter mode, but opened for the charge pump mode. In this manner, resistive element R1 and capacitive element C1 may be used in a feedforward path to pre-bias an input of the PWM comparator 604 when transitioning from the charge pump mode to the buck converter mode. The other input to the PWM comparator may receive a sawtooth signal (labeled "Ramp"). The PWM comparator 604 may be used to generate a PWM signal for the PWM logic 606 to provide an input signal to the multiplexer 610 for the buck converter mode. The Div2 logic 608 may receive and/or generate a 50% duty cycle square wave as an input signal to the multiplexer 610 for the charge pump mode.

Example Operations for Supplying Power

Figure 7:
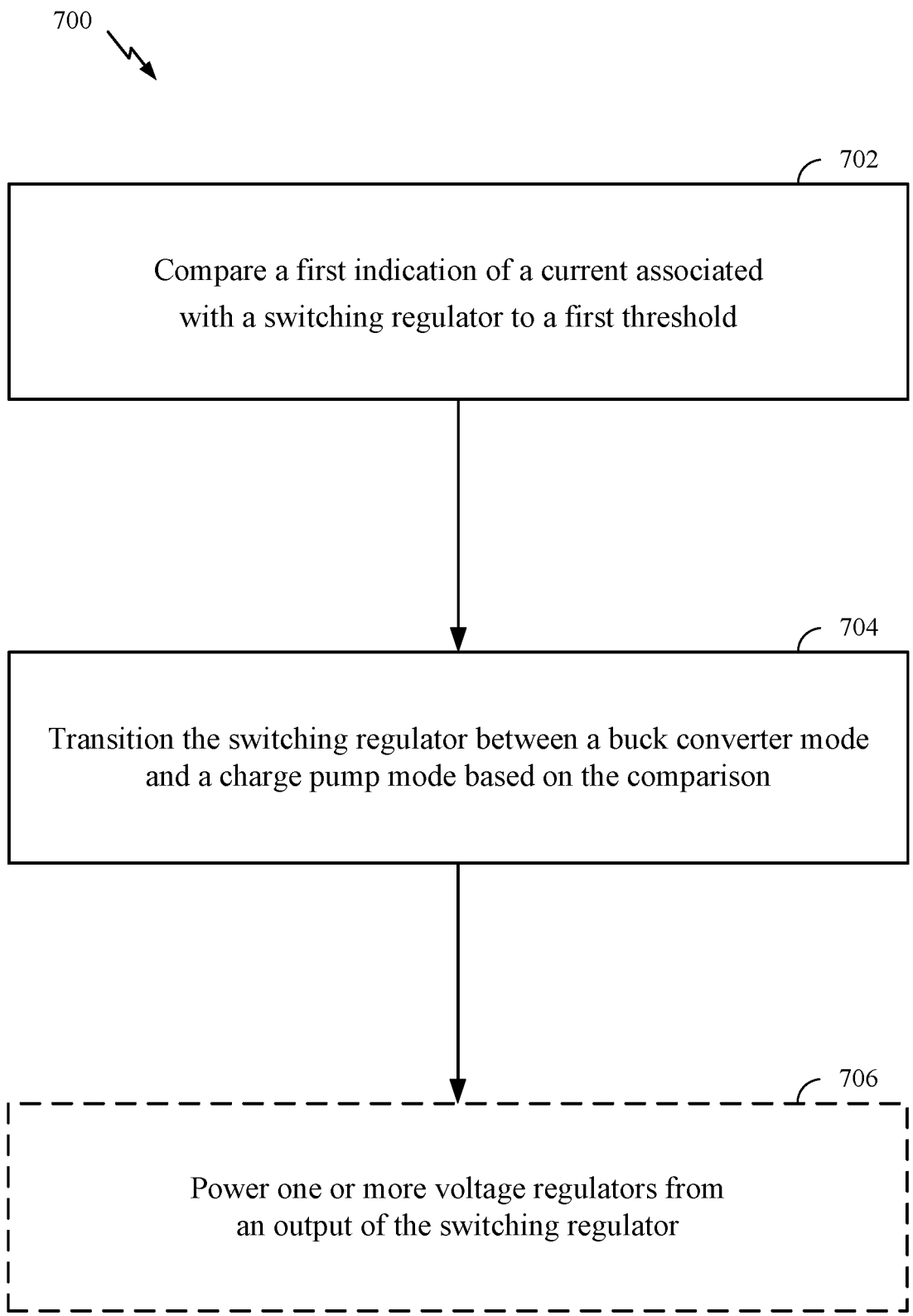
FIG. 7 is a flow diagram of example operations for supplying power, in accordance with certain aspects of the present disclosure.

FIG. 7 is a flow diagram of example operations 700 for supplying power, in accordance with certain aspects of the present disclosure. The operations 700 may be performed by a power supply circuit (e.g., the power supply circuit 300 of FIG. 3A, the power supply circuit 350 of FIG. 3B, or the power supply circuit 600 of FIG. 6).

The operations 700 may begin, at block 702, with the power supply circuit comparing a first indication of a current (e.g., Iout or Iin) associated with a switching regulator (e.g., the pre-regulator 218) to a first threshold (e.g., Ith_1 or Ith_h). At block 704, the power supply circuit transitions the switching regulator between a buck converter mode and a charge pump mode based on the comparison from block 702. The operation(s) in block 702 and/or block 704 may be controlled by control logic (e.g., control logic 301 or transition control logic 620) in or associated with the power supply circuit.

According to certain aspects, the operations 700 further involve receiving power at an input of the switching regulator from a battery (e.g., the battery circuit 215).

According to certain aspects, the current associated with the switching regulator comprises an output current of the switching regulator. For other aspects, the current associated with the switching regulator comprises an input current of the switching regulator.

According to certain aspects, the buck converter mode is a three-level buck converter mode. In this case, the charge pump mode may be a divide-by-two charge pump mode.

According to certain aspects, the transitioning at block 704 involves transitioning from the buck converter mode to the charge pump mode based on the comparison from block 702. In this case, transitioning from the buck converter mode to the charge pump mode may include closing a switch (e.g., switch S1) coupled in parallel with an inductive element (e.g., inductive element L1) of the switching regulator. For certain aspects, transitioning from the buck converter mode to the charge pump mode includes: (1) ramping up an output voltage of the switching regulator if a duty cycle of the buck converter mode is less than 50% or (2) ramping down the output voltage of the switching regulator if the duty cycle of the buck converter mode is more than 50%. For certain aspects, the operations 700 may further involve the power supply circuit comparing a second indication of the current associated with the switching regulator to a second threshold (e.g., after the transitioning of the switching regulator to the charge pump mode) and transitioning the switching regulator from the charge pump mode to the buck converter mode based on the comparison to the second threshold. In this case, transitioning from the charge pump mode to the buck converter mode may include ramping down an output voltage of the switching regulator if a duty cycle of the buck converter mode is less than 50% or ramping up the output voltage of the switching regulator if the duty cycle of the buck converter mode is more than 50%. The second threshold may be greater than the first threshold.

According to certain aspects, the transitioning at block 704 involves transitioning the switching regulator from the charge pump mode to the buck converter mode based on the comparison from block 702. In this case, transitioning from the charge pump mode to the buck converter mode may include opening a switch (e.g., switch S1) coupled in parallel with an inductive element (e.g., inductive element L1) of the switching regulator.

According to certain aspects, the operations 700 further involve powering one or more voltage regulators (e.g., voltage regulators 230) from an output of the switching regulator at optional block 706.

According to certain aspects, the buck converter mode comprises a multi-phase buck converter mode and/or the charge pump mode comprises a multi-phase charge pump mode. For example, the buck converter mode may be a dual-phase buck converter mode, and the charge pump mode may be a single-phase or a dual-phase charge pump mode. As another example, the buck converter mode may be a single-phase buck converter mode, and the charge pump mode may be a single-phase or a dual-phase charge pump mode.

Example Aspects

In addition to the various aspects described above, specific combinations of aspects are within the scope of the disclosure, some of which are detailed below:

Aspect 1: A power supply circuit comprising a switching regulator and control logic coupled to the switching regulator. The control logic is configured to compare a first indication of a current associated with the switching regulator to a first threshold and to control a transition of the switching regulator between a buck converter mode and a charge pump mode based on the comparison.

Aspect 2: The power supply circuit of Aspect 1, further comprising a battery coupled to an input of the switching regulator.

Aspect 3: The power supply circuit of Aspect 2, wherein the battery comprises a multi-cell-in-series battery.

Aspect 4: The power supply circuit of any preceding Aspect, wherein the switching regulator comprises a three-level buck converter selectively configured as a divide-by-two charge pump.

Aspect 5: The power supply circuit of Aspect 4, wherein: the three-level buck converter comprises an inductive element and a switch coupled in parallel with the inductive element; the three-level buck converter is configured to operate in the buck converter mode when the switch is open; and the three-level buck converter is configured to operate in the charge pump mode when the switch is closed.

Aspect 6: The power supply circuit of any preceding Aspect, wherein the control logic is configured to control the transition by controlling a transition of the switching regulator from the buck converter mode to the charge pump mode based on the comparison.

Aspect 7: The power supply circuit of Aspect 6, wherein: the switching regulator comprises an inductive element and a switch coupled in parallel with the inductive element; and the control logic is configured to control the transition from the buck converter mode to the charge pump mode by controlling closing of the switch coupled in parallel with the inductive element.

Aspect 8: The power supply circuit of Aspect 6, wherein the control logic is configured to control the transition from the buck converter mode to the charge pump mode by: controlling ramping up of an output voltage of the switching regulator if a duty cycle of the buck converter mode is less than 50%; or controlling ramping down of the output voltage of the switching regulator if the duty cycle of the buck converter mode is more than 50%.

Aspect 9: The power supply circuit of Aspect 6, wherein the control logic is further configured to: compare a second indication of the current associated with the switching regulator to a second threshold, after the transition of the switching regulator to the charge pump mode; and control another transition of the switching regulator from the charge pump mode to the buck converter mode based on the comparison to the second threshold.

Aspect 10: The power supply circuit of Aspect 9, wherein the second threshold is greater than the first threshold.

Aspect 11: The power supply circuit of Aspect 9 or 10, wherein the control logic is configured to control the other transition from the charge pump mode to the buck converter mode by: controlling ramping down of an output voltage of the switching regulator if a duty cycle of the buck converter mode is less than 50%; or controlling ramping up of the output voltage of the switching regulator if the duty cycle of the buck converter mode is more than 50%.

Aspect 12: The power supply circuit of any of Aspects 1-5, wherein the control logic is configured to control the transition by controlling a transition of the switching regulator from the charge pump mode to the buck converter mode based on the comparison.

Aspect 13: The power supply circuit of Aspect 12, wherein: the switching regulator comprises an inductive element and a switch coupled in parallel with the inductive element; and the control logic is configured to control the transition from the charge pump mode to the buck converter mode by controlling opening of the switch coupled in parallel with the inductive element.

Aspect 14: The power supply circuit of any preceding Aspect, wherein the current associated with the switching regulator comprises an output current of the switching regulator.

Aspect 15: The power supply circuit of any preceding Aspect, further comprising one or more voltage regulators coupled to an output of the switching regulator.

Aspect 16: The power supply circuit of Aspect 15, wherein at least one of the one or more voltage regulators is at least partially disposed in a power management integrated circuit (PMIC).

Aspect 17: A method of supplying power, comprising: comparing a first indication of a current associated with a switching regulator to a first threshold; and transitioning the switching regulator between a buck converter mode and a charge pump mode based on the comparison.

Aspect 18: The method of Aspect 17, further comprising receiving power at an input of the switching regulator from a battery.

Aspect 19: The method of Aspect 17 or 18, wherein the buck converter mode comprises a three-level buck converter mode and wherein the charge pump mode comprises a divide-by-two charge pump mode.

Aspect 20: The method of any of Aspects 17-19, wherein the transitioning comprises transitioning from the buck converter mode to the charge pump mode based on the comparison.

Aspect 21: The method of Aspect 20, wherein transitioning from the buck converter mode to the charge pump mode comprises closing a switch coupled in parallel with an inductive element of the switching regulator.

Aspect 22: The method of Aspect 20 or 21, wherein transitioning from the buck converter mode to the charge pump mode comprises: ramping up an output voltage of the switching regulator if a duty cycle of the buck converter mode is less than 50%; or ramping down the output voltage of the switching regulator if the duty cycle of the buck converter mode is more than 50%.

Aspect 23: The method of any of Aspects 20-22, further comprising: comparing a second indication of the current associated with the switching regulator to a second threshold, after the transitioning of the switching regulator to the charge pump mode; and transitioning the switching regulator from the charge pump mode to the buck converter mode based on the comparison to the second threshold.

Aspect 24: The method of Aspect 23, wherein the second threshold is greater than the first threshold.

Aspect 25: The method of Aspect 23 or 24, wherein transitioning from the charge pump mode to the buck converter mode comprises: ramping down an output voltage of the switching regulator if a duty cycle of the buck converter mode is less than 50%; or ramping up the output voltage of the switching regulator if the duty cycle of the buck converter mode is more than 50%.

Aspect 26: The method of any of Aspects 17-19, wherein the transitioning comprises transitioning the switching regulator from the charge pump mode to the buck converter mode based on the comparison.

Aspect 27: The method of Aspect 26, wherein transitioning from the charge pump mode to the buck converter mode comprises opening a switch coupled in parallel with an inductive element of the switching regulator.

Aspect 28: The method of any of Aspects 17-27, further comprising powering one or more voltage regulators from an output of the switching regulator.

Aspect 29: The method of any of Aspects 17-28, wherein the current associated with the switching regulator comprises an output current of the switching regulator.

Aspect 30: An apparatus comprising a battery, a battery charging circuit having an output coupled to the battery, a switching regulator having an input coupled to the battery, and control logic coupled to the switching regulator. The control logic is configured to compare an indication of a current associated with the switching regulator to a threshold and to control a transition of the switching regulator between a buck converter mode and a charge pump mode based on the comparison.

The various operations of methods described above may be performed by any suitable means capable of performing the corresponding functions. The means may include various hardware and/or software component(s) and/or module(s), including, but not limited to a circuit, an application-specific integrated circuit (ASIC), or a processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:
   a switching regulator; and
   control logic coupled to the switching regulator and configured to:
      compare a first indication of a current associated with the switching regulator to a first threshold;
      control a transition of the switching regulator from a buck converter mode to a charge pump mode based on the comparison;
      compare a second indication of the current associated with the switching regulator to a second threshold, after the transition of the switching regulator to the charge pump mode; and
      control another transition of the switching regulator from the charge pump mode to the buck converter mode based on the comparison to the second threshold, wherein the second threshold is greater than the first threshold.

2. The power supply circuit of claim 1, further comprising a battery coupled to an input of the switching regulator.

3. The power supply circuit of claim 2, wherein the battery comprises a multi-cell-in-series battery.

4. The power supply circuit of claim 1, wherein the switching regulator comprises a three-level buck converter selectively configured as a divide-by-two charge pump.

5. The power supply circuit of claim 4, wherein:
   the three-level buck converter comprises an inductive element and a switch coupled in parallel with the inductive element;
   the three-level buck converter is configured to operate in the buck converter mode when the switch is open; and
   the three-level buck converter is configured to operate in the charge pump mode when the switch is closed.

6. The power supply circuit of claim 1, wherein the current associated with the switching regulator comprises an output current of the switching regulator.

7. The power supply circuit of claim 1, further comprising one or more voltage regulators coupled to an output of the switching regulator.

8. The power supply circuit of claim 7, wherein at least one of the one or more voltage regulators is at least partially disposed in a power management integrated circuit (PMIC).

9. The power supply circuit of claim 1, wherein:
the switching regulator comprises an inductive element and a switch coupled in parallel with the inductive element; and
the control logic is configured to control the transition from the buck converter mode to the charge pump mode by controlling closing of the switch coupled in parallel with the inductive element.

10. The power supply circuit of claim 1, wherein the control logic is configured to control the transition from the buck converter mode to the charge pump mode by:
controlling ramping up of an output voltage of the switching regulator if a duty cycle of the buck converter mode is less than 50%; or
controlling ramping down of the output voltage of the switching regulator if the duty cycle of the buck converter mode is more than 50%.

11. The power supply circuit of claim 1, wherein the control logic is configured to control the other transition from the charge pump mode to the buck converter mode by:
controlling ramping down of an output voltage of the switching regulator if a duty cycle of the buck converter mode is less than 50%; or
controlling ramping up of the output voltage of the switching regulator if the duty cycle of the buck converter mode is more than 50%.

12. The power supply circuit of claim 1, wherein:
the switching regulator comprises an inductive element and a switch coupled in parallel with the inductive element; and
the control logic is configured to control the other transition from the charge pump mode to the buck converter mode by controlling opening of the switch coupled in parallel with the inductive element.

13. A method of supplying power, comprising:
comparing a first indication of a current associated with a switching regulator to a first threshold;
transitioning the switching regulator from a buck converter mode to a charge pump mode based on the comparison;
comparing a second indication of the current associated with the switching regulator to a second threshold, after the transitioning of the switching regulator to the charge pump mode; and
transitioning the switching regulator from the charge pump mode to the buck converter mode based on the comparison to the second threshold, wherein the second threshold is greater than the first threshold.

14. The method of claim 13, further comprising receiving power at an input of the switching regulator from a battery.

15. The method of claim 13, wherein the current associated with the switching regulator comprises an output current of the switching regulator.

16. The method of claim 13, wherein the buck converter mode comprises a three-level buck converter mode and wherein the charge pump mode comprises a divide-by-two charge pump mode.

17. The method of claim 13, wherein transitioning from the buck converter mode to the charge pump mode comprises closing a switch coupled in parallel with an inductive element of the switching regulator.

18. The method of claim 13, wherein transitioning from the buck converter mode to the charge pump mode comprises:
ramping up an output voltage of the switching regulator if a duty cycle of the buck converter mode is less than 50%; or
ramping down the output voltage of the switching regulator if the duty cycle of the buck converter mode is more than 50%.

19. The method of claim 13, wherein transitioning from the charge pump mode to the buck converter mode comprises:
ramping down an output voltage of the switching regulator if a duty cycle of the buck converter mode is less than 50%; or
ramping up the output voltage of the switching regulator if the duty cycle of the buck converter mode is more than 50%.

20. The method of claim 13, wherein transitioning from the charge pump mode to the buck converter mode comprises opening a switch coupled in parallel with an inductive element of the switching regulator.

21. The method of claim 13, further comprising powering one or more voltage regulators from an output of the switching regulator.

22. An apparatus comprising:
a battery;
a battery charging circuit having an output coupled to the battery;
a switching regulator having an input coupled to the battery; and
control logic coupled to the switching regulator and configured to:
compare a first indication of a current associated with the switching regulator to a first threshold;
control a transition of the switching regulator from a buck converter mode to a charge pump mode based on the comparison;
compare a second indication of the current associated with the switching regulator to a second threshold, after the transition of the switching regulator to the charge pump mode; and
control another transition of the switching regulator from the charge pump mode to the buck converter mode based on the comparison to the second threshold, wherein the second threshold is greater than the first threshold.

23. A power supply circuit comprising:
a switching regulator; and
control logic coupled to the switching regulator and configured to:
compare a first indication of a current associated with the switching regulator to a first threshold;
control a transition of the switching regulator from a buck converter mode to a charge pump mode based on the comparison by:
controlling ramping up of an output voltage of the switching regulator if a duty cycle of the buck converter mode is less than 50%; or
controlling ramping down of the output voltage of the switching regulator if the duty cycle of the buck converter mode is more than 50%;
compare a second indication of the current associated with the switching regulator to a second threshold, after the transition of the switching regulator to the charge pump mode; and
control another transition of the switching regulator from the charge pump mode to the buck converter mode based on the comparison to the second threshold by:

controlling ramping down of the output voltage of the switching regulator if the duty cycle of the buck converter mode is less than 50%; or controlling ramping up of the output voltage of the switching regulator if the duty cycle of the buck converter mode is more than 50%.

24. The power supply circuit of claim 23, wherein:

the switching regulator comprises an inductive element and a switch coupled in parallel with the inductive element; and the control logic is configured to control the transition from the buck converter mode to the charge pump mode by controlling closing of the switch coupled in parallel with the inductive element.

25. The power supply circuit of claim 23, wherein:

the switching regulator comprises an inductive element and a switch coupled in parallel with the inductive element; and the control logic is configured to control the other transition from the charge pump mode to the buck converter mode by controlling opening of the switch coupled in parallel with the inductive element.

\* \* \* \* \*